United States Patent [19]

Fehrenbach et al.

[11] Patent Number: 4,615,320
[45] Date of Patent: Oct. 7, 1986

[54] DAMPER ELEMENT

[75] Inventors: Siegfried Fehrenbach, Markgröningen; Kurt Herbst, Burgstetten; Wolfgang Schulz, Bietigheim; Eberhard Utz, Stuttgart, all of Fed. Rep. of Germany

[73] Assignee: Robert Bosch GmbH, Stuttgart, Fed. Rep. of Germany

[21] Appl. No.: 610,380

[22] Filed: May 15, 1984

[30] Foreign Application Priority Data

Jul. 27, 1983 [DE] Fed. Rep. of Germany ....... 3326995

[51] Int. Cl.⁴ ............................................. F02M 39/00
[52] U.S. Cl. .................... 123/467; 123/447; 123/456; 138/30
[58] Field of Search ............... 123/467, 457, 460, 469, 123/447, 456, 463, 510, 511, 512, 513; 251/367; 137/315; 138/30

[56] References Cited

U.S. PATENT DOCUMENTS

| | | | |
|---|---|---|---|
| 2,977,947 | 4/1961 | Carleton | 123/457 |
| 3,507,263 | 4/1970 | Long | 123/460 |
| 4,064,854 | 12/1977 | Fehrenbach | 123/179 L |
| 4,186,776 | 2/1980 | Burton | 138/30 |
| 4,205,637 | 6/1980 | Ito | 123/457 |
| 4,373,872 | 2/1983 | Kemmner | 138/30 |

Primary Examiner—Carl Stuart Miller
Attorney, Agent, or Firm—Edwin E. Greigg

[57] ABSTRACT

A damper element is proposed which serves to damp a pulsating fluid flow, and in particular to smooth out and reduce pressure fluctuations arising in fuel supply systems for internal combustion engines in motor vehicles. The damper element includes at least one damper diaphragm which is fastened in a damper housing and defines a fluid chamber on one side. A connection fitting is disposed on the damper housing and is inserted into a plug connection of a fluid flow cross section. A flow opening is embodied in the fluid flow cross section, being open toward the fluid chamber and toward the fluid flow cross section. The flow opening and the fluid flow cross section are penetrated by a flow tube arranged to protrude therethrough, and into which a first fluid line, which discharges into the fluid chamber, is embodied. Between the flow tube and the wall of the flow opening, an annular, second fluid line is embodied.

6 Claims, 1 Drawing Figure

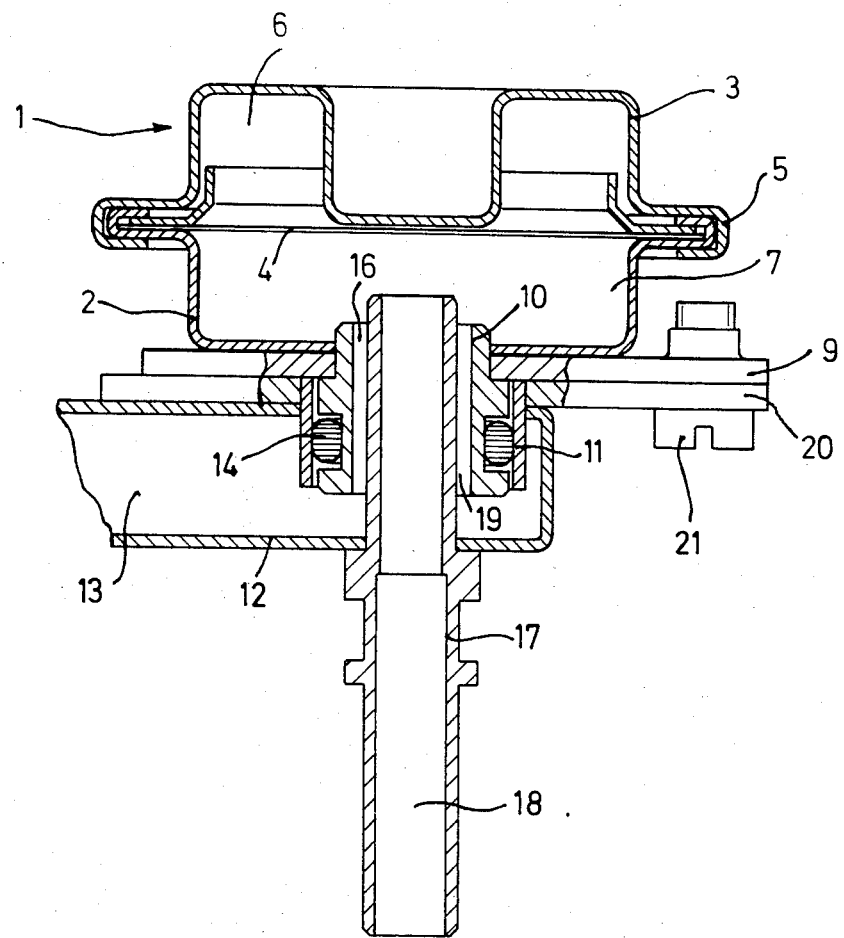

DAMPER ELEMENT

BACKGROUND OF THE INVENTION

The invention is based on a damper element as generally defined hereinafter.

A damper element is already known in which the connection to the flowing fluid is effected via two separate connection fittings, so that when the element is installed a separate flow connection must be established for each of them. This produces problems in terms of sealing and requires additional space for accommodating the element.

OBJECT AND SUMMARY OF THE INVENTION

The damper element according to the invention has the advantage over the prior art that when the damper element is installed only a plug connection needs to be made, and not only is less space required but only one connection needs to be sealed off.

To reduce the required space still further, it is advantageous to make the plug connection protrude into the fluid flow cross section. It is particularly advantageous to use the damper element according to the invention in connection with a fuel supply system of an internal combustion engine, and to dispose it between the fuel distributor tube and the fuel feed pump.

The invention will be better understood and further objects and advantages thereof will become more apparent from the ensuing detailed description of a preferred embodiment taken in conjunction with the drawing.

BRIEF DESCRIPTION OF THE DRAWING

The single FIGURE of the drawing shows an exemplary embodiment of the invention which is described in detail below.

DESCRIPTION OF THE PREFERRED EMBODIMENT

The damper element 1 shown in the drawing by way of example has a damper housing comprising a bottom part 2 and a cap 3. Between the bottom part 2 and the cap 3, a damper diaphragm 4 is fastened in a sealing manner at its circumference by means of crimping as at 5 and thus divides a damper chamber 6 in the cap 3 from a fluid chamber 7 in the bottom part 2. A fastening flange 9 and a connection fitting 10 are secured in a sealed manner on the bottom part 2 remote from the damper diaphragm 4. The connection fitting 10 is inserted into a plug connection 11, which is sealingly connected with the wall 12 of a fluid flow connection 13. The plug connection 11 advantageously protrudes into the fluid flow cross section. Sealing between the plug connection 11 and the connection fitting 10 can be effected by means of a sealing ring 14. A flow opening 16 is formed in the connection fitting 10, being open toward the fluid chamber 7 and the fluid flow cross section 13.

Protruding through the flow opening 16 is a flow tube 17, which likewise passes through the fluid flow cross section 13 and is secured in a sealing manner on the wall 12 of the fluid flow cross section 13. A first fluid line 18 is embodied in the flow tube 17; this first fluid line 18 is open toward the fluid chamber 7 and fluid, by way of example, can flow by way of it in the direction toward the fluid chamber 7. Between the flow tube 17 and the wall 16 of a flow opening in the connection fitting 10, an annular, second fluid flow line 19 is formed, which keeps open the connection between the fluid chamber 7 and the fluid flow cross section 13. The damper element 1 is secured via the fastening flange 9 and a further fastening flange 20, disposed on the wall 12 of the fluid flow cross section 13, by means of screws 21. Thus when the damper element 1 is installed, all that needs to be done is to insert the connection fitting 10 of the damper element 1 into the plug connection 11 and to perform the positional fixation via the screws 21.

In an advantageous application of the invention, the damper element 1 is integrated by way of example into a fuel injection system, by connecting the flow tube 17 with the pressure side of a fuel feed pump, not shown, which effects a pulsed fuel feed. The flow tube 17 in this application is disposed on the fuel distributor tube, acting as the fluid flow cross section 12, 13, through which the individual injection valves are supplied with fuel. In this case not only are fuel pulsations of the fuel which are caused by the fuel feed pump damped in the fluid chamber 7, but also pulsations arising from the opening and closing of the fuel injection valves and which reach the fluid chamber 7 through the fuel distributor tube 12, 13 and the second fluid line 19.

The foregoing relates to a preferred exemplary embodiment of the invention, it being understood that other variants and embodiments thereof are possible.

What is claimed and desired to be secured by Letters Patent of the United States is:

1. A damper element for damping a pulsating fluid flow, in particular for smoothing out and reducing pressure fluctuations arising in fuel supply systems for internal combustion engines in motor vehicles, having at least one damper diaphragm, which is fastened in a damper housing and on one side defines a fluid chamber in the damper housing into or out of which chamber fluid can flow via two separate fluid lines, characterized in that said damper housing includes a connection fitting which is sealingly insertable at its circumference into a plug connection secured to one wall of a fluid flow cross section, sealing means surrounding said connection fitting which sealingly seals said connection fitting, said connection fitting further having a cylindrical flow opening open toward said fluid chamber and said fluid flow cross section, and a flow tube secured to one wall of said fluid flow cross section and arranged to protrude through said fluid flow cross section and through said flow opening of said connection fitting into said fluid chamber thereby forming a cylindrical passage, whereby a first fluid flow line is formed by said flow tube and a second fluid flow line is formed by said flow tube and said flow opening of said connection fitting.

2. A damper element as defined by claim 1, further wherein said plug connection protrudes into said fluid flow cross section.

3. A damper element as defined by claim 1, further wherein said flow cross section through which said flow tube protrudes comprises a fuel distributor tube of a fuel supply system of an internal combustion engine, and a first fluid flow line conjoined with said flow tube communicates with the pressure side of a fuel feed pump.

4. A damper element as defined by claim 1, further wherein said plug connection includes means arranged to abut a fastening flange and further means which extend through means defining an aperture in said fastening flange.

5. A damper element as defined by claim 1, further wherein means comprising said plug connection is positioned in means defining an aperture in a further fastening flange.

6. A damper element as defined by claim 2, further wherein said flow cross section through which said flow tube protrudes comprises a fuel distributor tube of a fuel supply system of an internal combustion engine, and a first fluid flow line conjoined with said flow tube communicates with the pressure side of a fuel feed pump.

* * * * *